(12) United States Patent
Thompson (10) Patent No.: US 6,299,216 B1
(45) Date of Patent: Oct. 9, 2001

(54) JOINTS

(75) Inventor: David Francis Thompson, Northwich (GB)

(73) Assignee: Codelast Limited (GB)

( * ) Notice: Subject to any disclaimer, the term of this patent is extended or adjusted under 35 U.S.C. 154(b) by 0 days.

(21) Appl. No.: 09/214,223

(22) PCT Filed: Jul. 2, 1997

(86) PCT No.: PCT/GB97/01778

§ 371 Date: Feb. 26, 1999

§ 102(e) Date: Feb. 26, 1999

(87) PCT Pub. No.: WO98/01696

PCT Pub. Date: Jan. 15, 1998

(30) Foreign Application Priority Data

Jul. 3, 1996 (GB) .................................................. 9613948
Aug. 23, 1996 (GB) .................................................. 9617666

(51) Int. Cl.⁷ .............................. F16L 23/16; F16L 55/00
(52) U.S. Cl. ........................... 285/93; 285/351; 285/368; 73/46; 277/318
(58) Field of Search .............................. 285/93, 336, 351, 285/368; 277/318, 320, 614, 611; 73/46

(56) References Cited

U.S. PATENT DOCUMENTS

| | | | |
|---|---|---|---|
| 3,141,685 | * | 7/1964 | Watts . |
| 3,220,245 | * | 11/1965 | Van Winkle . |
| 3,290,047 | * | 12/1966 | Mayer . |
| 3,521,892 | * | 7/1970 | Sheesley et al. . |
| 3,628,812 | * | 12/1971 | Larralde ................................. 285/93 |
| 3,704,021 | * | 11/1972 | Barbarin et al. . |
| 3,711,123 | * | 1/1973 | Arnold ................................... 285/93 |
| 3,954,288 | * | 5/1976 | Smith ...................................... 285/93 |
| 4,019,371 | * | 4/1977 | Chaplin et al. . |
| 4,095,809 | * | 6/1978 | Smith . |
| 4,294,477 | * | 10/1981 | Ahlstone . |
| 4,410,186 | * | 10/1983 | Pierce . |
| 4,716,005 | * | 12/1987 | Ezekoye et al. . |
| 4,776,600 | * | 10/1988 | Kohn . |
| 5,468,023 | * | 11/1995 | Galle et al. . |

FOREIGN PATENT DOCUMENTS

| | | | | |
|---|---|---|---|---|
| 939967 | * | 3/1956 | (DE) | ..................................... 285/351 |
| 854189 | * | 11/1960 | (GB) | ..................................... 285/351 |
| 3017268 | * | 9/1993 | (WO) | ..................................... 285/93 |

\* cited by examiner

*Primary Examiner*—Eric K. Nicholson
(74) *Attorney, Agent, or Firm*—Fulbright & Jaworski LLP (57) ABSTRACT

A joint comprising a main seal, a secondary seal and an external pressure test port providing access to a cavity between the main seal and the secondary seal wherein the integrity of the main seal can be tested in its in-service direction by applying pressure to the cavity via the pressure test port such that the cavity is pressurised and the main seal is tested. Following testing of the main seal, the secondary seal may become redundant during normal use of the joint. In some embodiments, however, the integrity of the main seal can be retested at any time due to the reusability of the secondary seal.

39 Claims, 6 Drawing Sheets

JOINTS

This invention relates to joints having seals, and to a system for testing the integrity of the seal of a joint. The invention is particularly applicable to flange joints of a pipeline, for example, and provides a system for testing the integrity of a flange joint without introducing pressure into the pipe work itself of the pipeline.

During the erection or installation of new pipe work, or after modification or maintenance of previously assembled flange joints, the joints will usually require testing for leaks. The present invention is directed towards a system which allows for such testing to be carried out in a safer, quicker and more efficient way. The system will prove the integrity of a joint under test, without hating to enter gas or liquid into the main pipe work of the pipeline.

In addition certain seal configurations according to the present invention allow a high pressure seal to be made to the flange joints with the flange bolts only being subjected to a low torque value.

At present, when a pipeline is assembled, the individual lengths of pipe are provided with end flanges which are bolted to adjacent flanges of adjacent pipes. An annular ring joint seal is provided between the flanges to prevent material, whether it be in solid, liquid or gaseous form, travelling along the pipeline from escaping between the flanges. Often, such ring seals are positioned within opposing recesses formed in the flanges. The flanges are bolted together, thereby applying compression to the ring seal to produce a reliable seal for the flange joint.

In most environments, it is necessary to test the integrity of a flange joint seal. In the off-shore petrochemical environment, it is imperative that flange joints are completely secure, and that hydrocarbons (i.e. in the form of gas or petroleum) passing along a pipeline do not leak from the pipeline. Clearly, if a leak does exist, however small, catastrophic consequences can result. Hence, it is a requirement that all flange joint seals be tested prior to use. Such testing is, at present, extremely time consuming and costly to undertake.

With the foregoing in mind, the present invention aims to provide a novel and inventive joint integrity testing system which is safe, simple to operate and virtually foolproof, without the need to introduce testing material, which can be hazardous, into the main pipeline.

According to the present invention, there is provided a joint comprising a main seal, a secondary seal and a pressure test port providing access to a cavity between the main seal and the secondary seal, wherein the integrity of the main seal can be tested by applying pressure to the cavity via the pressure test port such that the cavity is pressurized and the main seal is tested.

As those skilled in the relevant art will appreciate, the invention requires the provision of a cavity, which is ideally separate from the main pipeline, which involves the main seal such that pressure in the cavity is applied to the main seal. If the secondary (or temporary) seal is between the main seal and the bore of the pipeline, pressure is applied to the secondary seal in a direction which is opposite to that applied to the main seal during normal usage of the main seal. This is something which, as far as the present inventor is concerned, has never before been envisaged in this particular field. Alternatively, of course, in certain flange/joint configurations the secondary seal may be outboard of the main seal.

As will be appreciated, a joint according to the present invention allows, on completion, one operator using equipment which can be hand carried to test the integrity of the joint without introducing hazardous pressure to the bore of the pipeline. Further, the pressure ratings that can be tested range from low pressure to the maximum pressure the flange joint is designed for. Furthermore, although the present invention is particularly applicable to flange joints, in theory it could be used in any environment where a seal is provided between two adjacent surfaces.

Following testing, during normal use of the joint, the secondary seal may be redundant. Indeed, after testing of the main seal, the secondary seal may be destroyed during normal use of the main seal. Such a secondary (or temporary) seal is known as a sacrificial seal.

Preferably the pressure test port, which is accessed from the outside of the joint, is threaded to accommodate a high pressure connector. Furthermore, following testing of the main seal, a blanking plug may be screwed into the threaded pressure test port to close off the port. Alternatively, a pressure gauge, for example, could be applied to enable the pressure in the pipeline to be monitored.

To check the integrity of the main seal, a leak detection port may be included. The leak detection port may communicate with a chamber behind the main seal. Alternatively, the leak detection port may communicate with a chamber defined by the main seal.

The main seal may define two chambers in the joint, the two chambers being joined via a duct through the main seal. As a result, only one leak detection port adjacent the main seal is required.

Preferably the leak detection port is threaded to accommodate a sensor. Following initial testing of the main seal, a pressure gauge or other sensor may be applied to the threaded leak detection port to enable failure of the main seal to be noted, possibly before the main seal fails completely.

If necessary, a bleed port may be provided which communicates with the cavity between the main seal and the secondary seal. If such a port is provided, the cavity may be vented via the bleed port as a pressurising medium, such as a gas, is applied to the cavity via the pressure test port.

In a particularly preferred embodiment, the main seal is an annular seal. It is also preferred that the temporary seal is an "O" ring seal. As mentioned above, however, other shaped seals and general arrangements can be envisaged which do not depart from the scope of the present invention.

The present invention is particularly applicable to a flange joint comprising two flanges, the main seal being held between the flanges. The flanges are also preferably secured together by means of bolts which can be used to compress the main seal between the flanges.

The secondary (or temporary) seal may be positioned within a recess defined between the two flanges.

At least one of the flanges is preferably shaped to receive the secondary seal. If a recess is formed in one of the flanges, the second flange may be a standard flange which has not been modified in any way to cater for a joint according to the present invention. Alternatively, the second flange may include an annular wall for abutting the secondary seal.

In another embodiment, both of the flanges may incorporate recesses for accommodating a respective secondary seal with an annular support wall positioned between the two seals.

The secondary seal, in use, may bear against a support plate. The support plate may be an annular disc defining shoulders for two secondary seals. Alternatively, the annular disc may include a forked edge against which the secondary seal bears during testing of the main seal.

If necessary, a rigid annular ring may be provided outside the secondary seal to support the secondary seal during normal usage of the joint.

The support plate may define a recess for the or each secondary seal.

In another embodiment, the or each secondary seal may be bonded to the support plate.

If a support plate is used, the inside diameter of the support plate is preferably equal to or greater than the bore of each flange. As a result, the support plate will not hinder the flow of fluid through the pipeline itself.

If a support plate is used, the support plate may include surface fins which contact the flanges, during use, to prevent the support plate from moving relative to the flanges after assembly. Indeed, if necessary, the fins may be crushable during assembly to enable sufficient pressure to be applied by the flanges to the main seal. As a result, the support plate is likely to be held very tightly between the flanges, but will not prevent fluid within the pipeline from passing the support plate and contacting the main seal of the flange joint. With this in mind, in some embodiments, it may be preferable for the main seal to be continuously in contact with the fluid or other material passing along the pipeline.

During normal use of the joint, the secondary seal may bear against a support. As a result, the secondary seal may be re-usable, thereby allowing the integrity of the main seal to be tested again at a later date. Indeed, regular inspections and tests of the main seals in a pipeline can be undertaken, possibly without emptying the main bore of the pipeline.

The support for the secondary seal may be an intermittent or castellated shoulder to allow fluid to pass the secondary seal and contact the main seal. Alternatively, or in addition, the support may include holes or apertures through which fluid can pass to the main seal.

As will be appreciated from the foregoing and the following description of the present invention, the secondary seal may essentially be a non-return valve which allows fluid to flow during normal usage of a pipeline, but which acts as a stop valve when the integrity of its associated main seal is to be tested.

Although the main seal may be an annular ring joint seal as mentioned above, other forms of seals, such as a planar gasket or sealing material, or even a pair of recessed O-rings held in position by an annular support, may also be appropriate.

According to another aspect of the present invention, there is provided a method of testing a flange joint defined by two flanges and a main seal therebetween, the method comprising providing a secondary seal spaced from the main seal, pressurizing a cavity formed by the main seal, the secondary seal and the flanges, and evaluating the seal formed between the main seal and the flanges.

The secondary seal may be redundant during normal use of the main seal. Accordingly, the secondary seal may be a non-return valve.

The evaluation of the main seal may be achieved using a pressure gauge. Any other appropriate sensor can, of course, alternatively be used.

Preferably a threaded pressure test port provides communication between the cavity and the pressure gauge or other sensor. Following testing of the main seal, the pressure test port may be closed by means of a blanking plug. If the blanking plug is part drilled, a slow release of pressure within the cavity may be achieved by drilling into the blanking plug to provide a complete drill hole from the pressure test port to the atmosphere outside the blanking plug.

Specific embodiments of the present invention are now described, by way of example only, with reference to the accompanying drawings, in which.

Figure 1:
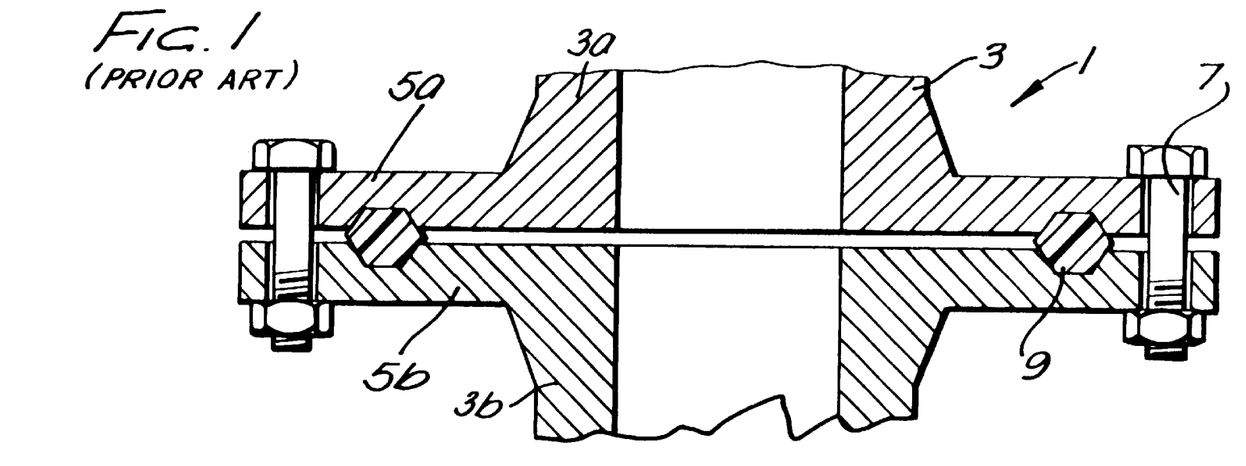
FIG. 1 is a sectional side view of a standard prior art pipeline flange joint.

With reference to FIG. 1 of the accompanying drawings, a flange joint 1 of a pipeline 3 comprises a first length of pipe 3a carrying an end flange 5a and a second length of pipe 3b carrying an end flange 5b held together by means of bolts 7 around the pipeline 3. Between the flanges 5a, 5b, an annular main seal 9, such as a conventional soft iron gasket, is compressed to prevent the egress of fluid from the pipeline during use. The embodiments of joint according to the present invention defined hereinafter are based on this standard type of flange joint.

Figure 2:
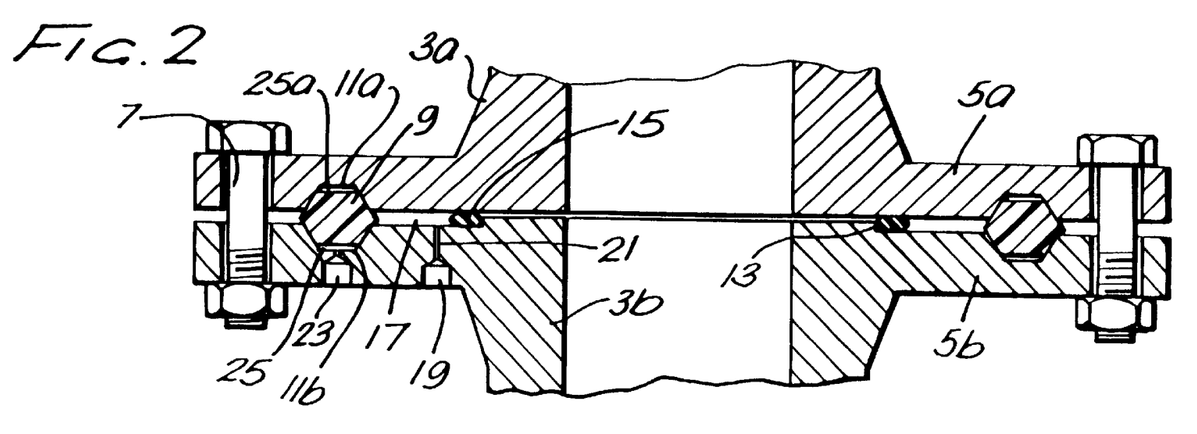
FIG. 2 is a shoulder profile of flange joint according to the present invention.

Turning now to FIG. 2, the first embodiment of joint according to the present invention will be described. In particular, the joint comprises a first flange 5a and a second flange 5b formed at ends of pipe lengths 3a, 3b forming part of a complete pipeline (not shown). An annular main seal 9 is received in recesses 11a, 11b formed in opposing faces of the flanges 5a, 5b. In the embodiment shown, the main seal 9 has a substantially hexagonal cross section and is compressed between the flanges 5a, 5b by means of a plurality of bolts 7, one of which is shown, around the periphery of the flanges 5a, 5b. In other embodiments (not shown), the main seal may have an oval, circular or even square cross-section, if appropriate.

Although one of the flanges 5a is of standard form, the second flange 5b is provided with a raised shoulder 13 for supporting a sacrificial "O" ring seal 15. The size of the shoulder 13, both in thickness and depth, will depend upon the flange pressure rating, shore hardness and type of material from which the "O" ring is manufactured, the flange diameter, the type of material from which the flange is manufactured, etc. A cavity 17 is formed between the sacrificial seal 15 and the main seal 9, which cavity 17 is separated from the main bore of the pipeline 3 by means of the sacrificial seal 15.

An external threaded pressure test port 19 communicates with the cavity 17 by means of a duct 21 which may be about 2 mm in diameter. The threaded pressure test port 19 is adapted to receive a high pressure connection to which an hydraulic or gas pump (or possibly an accumulator) can be connected. In the event that the cavity 17 requires bleeding or venting prior to pressure testing, a second duct (not shown) between the cavity 17 and an outlet port (not shown) may be provided.

A threaded leak detection port 23 communicates with a chamber 25 formed between the main seal 9 and the recess 11b of the flange 5b. If a second chamber 25a is formed between the main seal 9 and the recess 11a in the other flange 5a, a communication duct (not shown may be formed through the main seal 9 to join the two chambers 25,25a. If the main seal 9 fails, fluid will reach the chambers 25,25a and can be detected via the leak detection port 23. If necessary, some form of sensor (not shown), such as a pressure gauge, can be attached to the leak detection port 23.

Although the pipeline 3 and flanges 5 can be made of any suitable material, typical materials are: stainless steel, super stainless steel (with 6% molybdenum) duplex, super duplex, carbon steel, low temperature carbon steel, inconel, etc. Likewise, although the "O" ring seal 15 can be of any appropriate material, typical materials are: high, medium or low nitrile, fluoro-carbon, silicone, ethylene propylene, viton, styrene butadiene, polychloroprene, etc.

Once the flange has been assembled with the main seal 9 and "O" ring 15 in position, bolts 7 will be tightened to the recommended pressure. An operator with a pressure pumping unit (not shown) will then connect the pressure pumping unit to the threaded pressure test port 19. Pressure is then applied to the cavity 17 through the duct 21 with the main seal 9 and sacrificial seal 15 preventing loss of pressure. Due to the small volume of the cavity 17, it may be necessary to include an accumulator or some form of pressure reservoir into the pressurising system. When the cavity 17 has been pressurized to the required test pressure, the integrity of the main seal 9 in its in-service direction can be checked via the leak detection port 23. With this in mind, the choice of sacrificial seal 15 can be made to ensure that the seal provided by the sacrificial seal 15 is at least as good as that of the main seal 9, thereby ensuring that the sacrificial seal 15 will not fail before the main seal 9 has been tested to full capacity.

Figure 3:
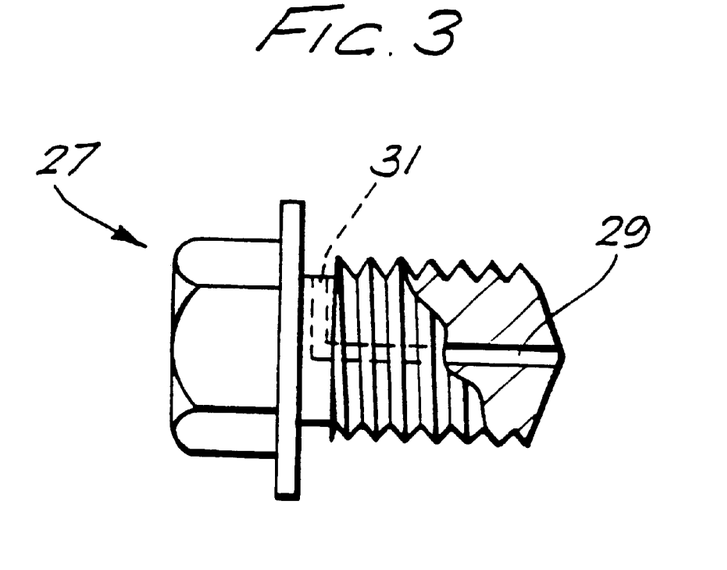
FIG. 3 is a side view of a blanking plug for use with a flange joint according to the present invention.

When the integrity of the main seal 9 has been tested and found to be acceptable, pressure in the cavity 17 can be reduced and the pressure test port 19 can be closed with a blanking plug of the sort shown in FIG. 3. The leak detection port 23 can also be closed off with a blanking plug 27 or, alternatively, a pressure gauge, for example, may be left in situ to enable an observer to check the integrity of the main seal 9 during normal usage of the pipeline 3.

As shown in FIG. 3, the blanking plug 27 can be provided with a drilled axial shaft 29 so that, if it is desired to release the pressure in the cavity 17 at a later date without the risk of the blanking plug 27 being blown away from the test port 19 as it is unscrewed from the test port 19, a side shaft 31 can be drilled into the blanking plug 27 to join the axial shaft 29. In this way, slow release of pressure within the cavity 17 may be achieved.

Assuming that the main seal 9 passes its pressure test, the flange joint can be put into operation. When this happens, the sacrificial seal 15 receives pressure in the direction of its non-supported side (i.e. from the bore of the pipeline 3) and may, as a result, burst under relatively low pressure. The main seal 9 will then come into contact with the fluid within the pipeline 3 and the flange system will function as it was originally designed.

Figure 4:
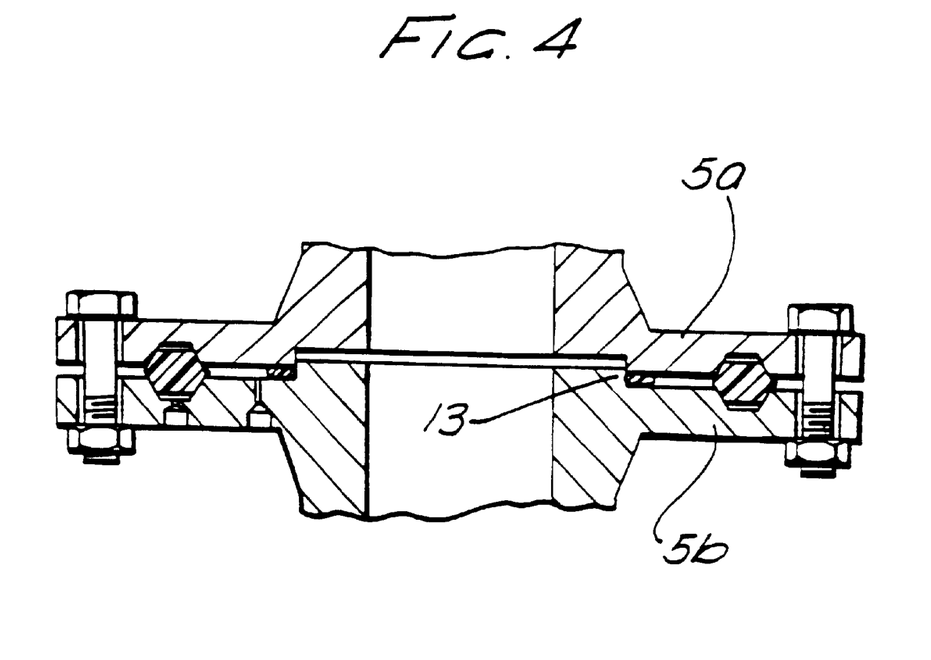
FIG. 4 is a sectional side view of an alternative flange joint arrangement according to the present invention.

An alternative embodiment of flange arrangement is shown in FIG. 4 of the drawings, in which a flange joint includes a female flange 5a for receiving a male flange 5b. By using such a flange arrangement, a shoulder 13 is automatically provided on the male flange 5b to support the sacrificial seal 15. Other arrangements of flange configuration, which can be manufactured and used for the installation of new pipelines, can be envisaged by those skilled in the relevant art.

Figure 5:
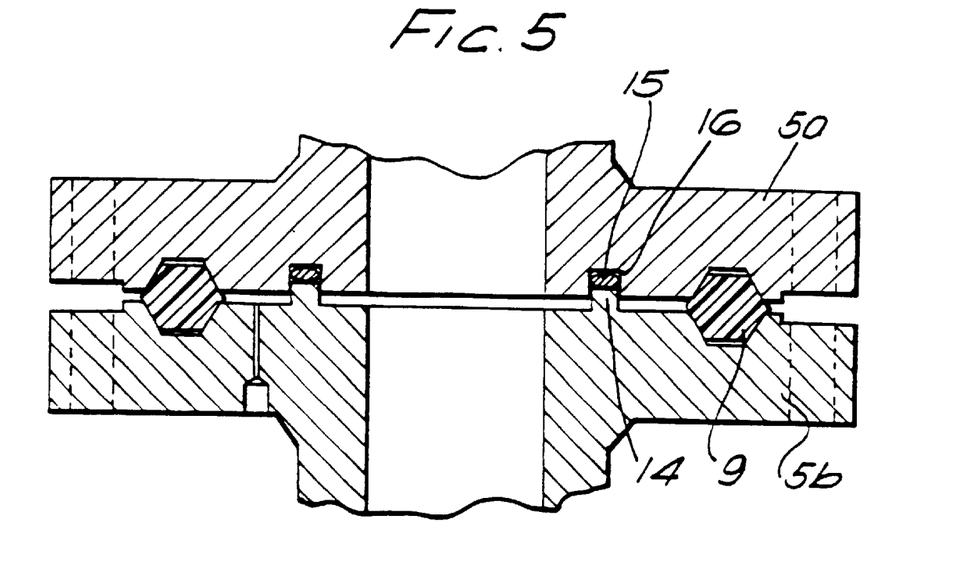
FIG. 5 is a sectional side view of another flange joint arrangement according to the present invention.

Such an arrangement is shown in FIG. 5 of the drawings. In this embodiment, the male flange 5b includes an annular upstand 14 which is shaped to be received in an annular recess 16 in the female flange 5a. A secondary seal 15 is accommodated in the recess 16 and is held therein during use by means of the upstand 14. In this embodiment, the secondary seal 15 may be non-sacrificial, and may in fact provide a degree of sealing during normal usage of the overall joint.

Figure 6A:
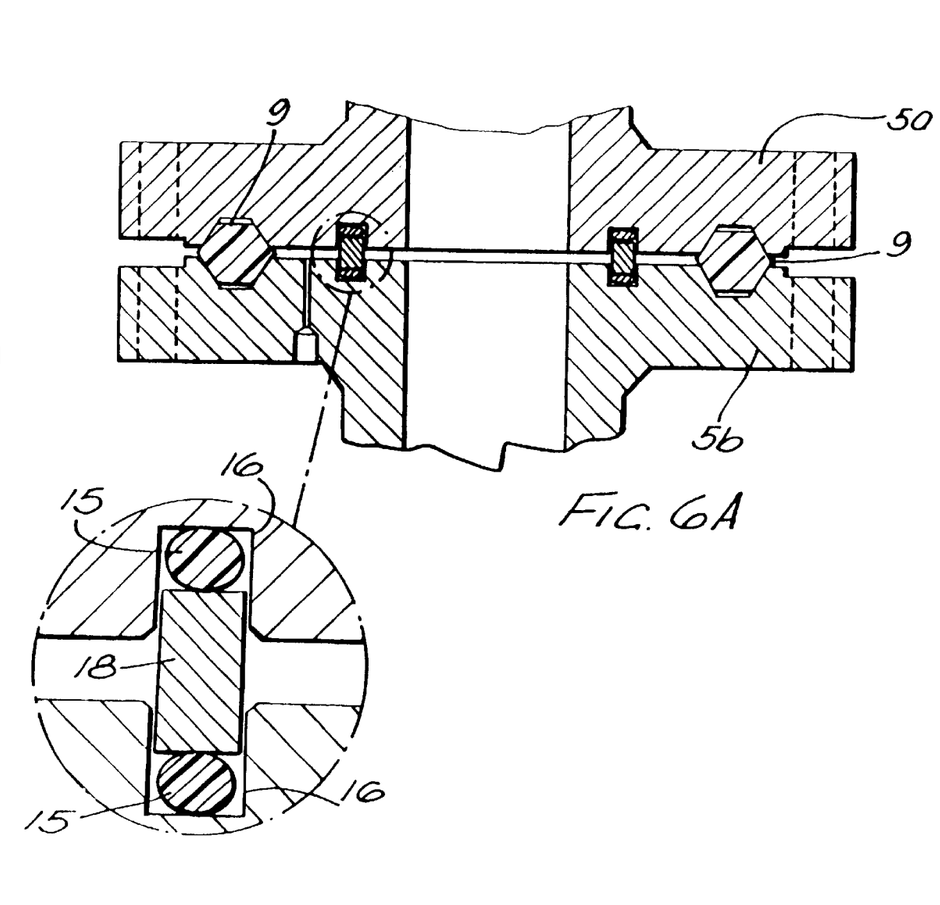
FIG. 6A is a sectional side view of a further flange joint arrangement according to the present invention.

A modified version of the embodiment of FIG. 5 is shown in FIG. 6A of the drawings. In this embodiment, rather than forming a flange 5b with an upstand 14, both flanges 5a, 5b are formed with recesses 16 and an annular ring 18 acts to retain a secondary seal 15 in each of the recesses 16. The annular ring 18 may be tapered or otherwise shaped for ease of entry into the recesses 16. As a result, existing standard flange configurations simply need routing to produce the recesses 16, rather than the addition of upstands 14 thereon.

Since a secondary seal of the kind shown in FIG. 6A would provide an excellent seal in both directions, it would be possible for a hydro test of the main piepework system to be undertaken simultaneously with a gas leak test of the main seal 9. In this way, the complete system would be under active conditions during testing of the main seal 9.

Figure 6B:
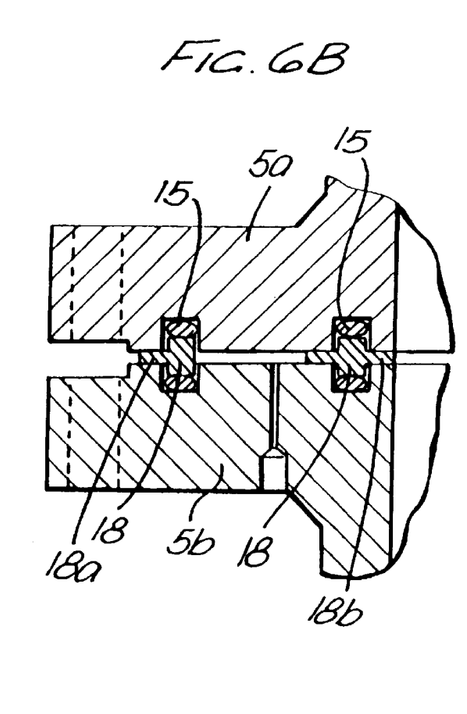
FIG. 6B shows alternative forms of seal similar to those shown in FIG. 6A.

Since the secondary seal shown in FIG. 6A provides an excellent seal in both directions, in theory the main seal 9 shown in FIG. 6A could be replaced by a seal similar to that secondary seal. Alternatively, a psychologically more secure main seal, such as shown in FIG. 6B, could be used. In this embodiment, the main seal includes "O" ring seals 15 in recesses 16 in each flange 5a, 5b with a T-shaped annular support 18 therebetween. During assembly of the joint, the flanges 5a, 5b are tightened together until they abut a leg 18a of the T, thereby providing a metal-metal seal as well as the seal provided by the "O" rings 15. This metal-metal seal could be assisted by a machined design on the leg 18a which bites into the flanges 5a, 5b; alternatively, a gasket material could be bonded to the leg 18a.

FIG. 6B also shows an alternative embodiment of secondary seal in which the annular ring 18, clamped between the two flanges 5a, 5b has a cruciform cross-section. Further, the internal leg 18b of the cruciform has a length which results in the internal diameter of the annular ring 18 being identical to the bore of the pipeline. As a result, smoother flow through the pipeline will occur due to turbulence at the flange joint being avoided. Further, the smooth flange joint will not provide a crevice for debris which may pass along the pipeline.

In another embodiment (not shown), the main seal could take the form of the secondary seal of FIG. 6B, with a cruciform cross-section annular ring 18. In such an embodiment, a multiple seal system incorporating six seals would effectively be produced, with three seals being formed by each cruciform annular ring. More particularly, each leg 18a, 18b would form a seal with the flanges 5a, 5b and each cruciform would also form a seal using the "O" rings 15. Similarly, if the main seal and the secondary seal both incorporate T-shaped annular rings 18, a four seal system would result. A five seal system would require one T-shaped and one cruciform annular ring 18.

Figure 7:
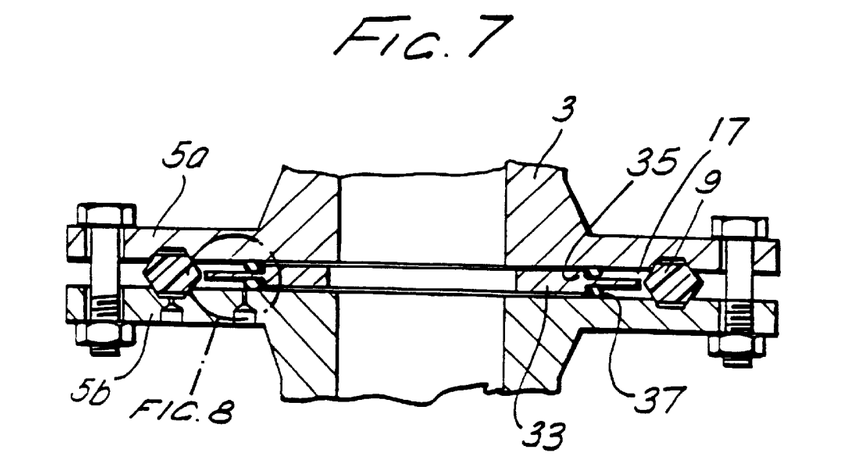
FIG. 7 is a schematic sectional side view of an embodiment of a flange joint according to the present invention which incorporates a support plate for the secondary seal(s)

With regard to existing pipeline systems, or new systems which use standard flange configurations, FIG. 7 shows a practical arrangement according to the present invention.

In FIG. 7, flanges 5a, 5b have substantially flat opposing surfaces provided with a support plate 33 therebetween. The support plate 33 is substantially planar and defines an annulus. The internal diameter of the annulus is larger than the internal diameter of the pipeline 3, thereby ensuring that the support plate 33 does not hinder the flow of fluid through the pipeline. Further, the support plate 33 defines two shoulders 35 for receiving two temporary or sacrificial seals 37. During testing of the main seal 9, the sacrificial seals 37 close the gaps between the support plate 33 and the flanges 5a, 5b to define a sealed cavity 17, as in the previous embodiments of joint according to the present invention. After the main seal 9 has been tested and the flange joint is put to functional use, pressure from within the pipeline 3 urges the sacrificial seals 37 outwardly, thereby exposing the main seal 9 to the fluid within the pipeline 3. At this time, the sacrificial seals 37 become redundant and may fail.

Figure 8:
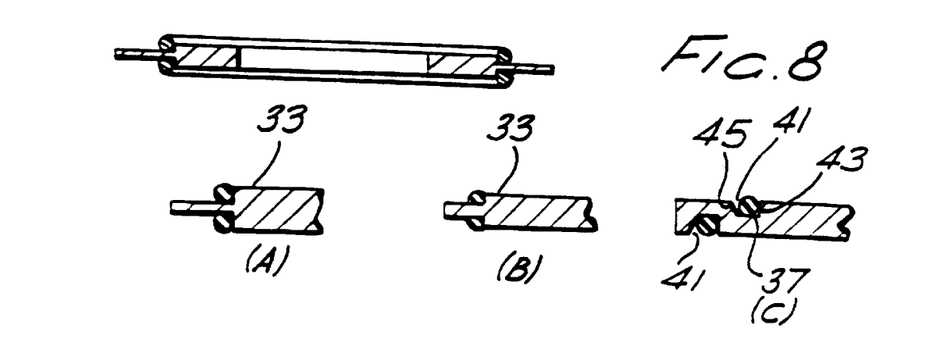
FIG. 8 shows three difference arrangements of support plate of the kind shown in FIG. 7.

With reference to FIG. 8 of the drawings, the support plate 33 shown in FIG. 7 is shown alone. Further, enlarged views A, B, C of the shoulder region of the support plate 33 are also shown in the drawings. Enlarged view A shows the basic form shown in FIG. 7, whereas the enlarged view B shows the two sacrificial seals 37 actually bonded to the shoulders 35 of the support plate 33. As a result, the seals 37 may be reusable for future testing of the main seal 9. Enlarged view C shows a more complicated embodiment wherein the seals 37 are accommodated in recesses 41 in the support plate 33. As can be seen, each recess 41 includes a wall 43 defining a shoulder against which the seal 37 can bear during testing of the main seal 9 and an inclined wall 45 against which the seals 37 bear during normal use of the pipeline. As a result, the seals 37 are not sacrificed during normal use of the pipeline and can, therefore, be reused during future tests of the main seal 9.

Figure 9:
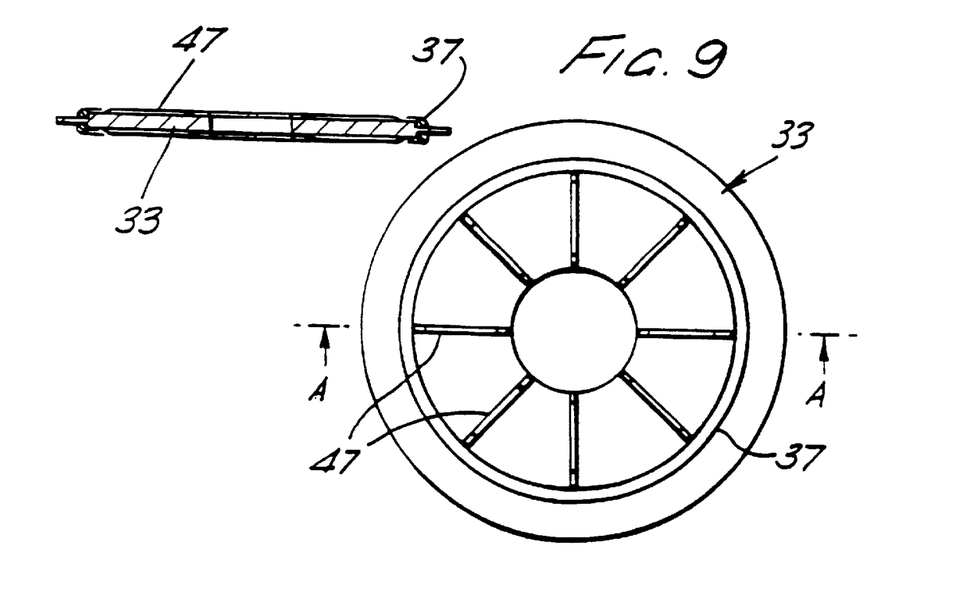
FIG. 9 shows a side view and plan view of a support plate incorporating fins.

Although the support plate 33 is substantially planar as shown in FIGS. 7 and 8, in an alternative embodiment shown in FIG. 9 the support plate 33 includes perpendicular fins 47. During assembly of the flange joints, the flanges 5a, 5b bear against the fins 47 and cause the fin 47 to collapse or crush slightly. As a result, the support plate 33 is held in position within the flange joint during use while still allowing fluid flowing through the pipeline to pass the support plate 33 and contact the main seal 9.

Figure 10:
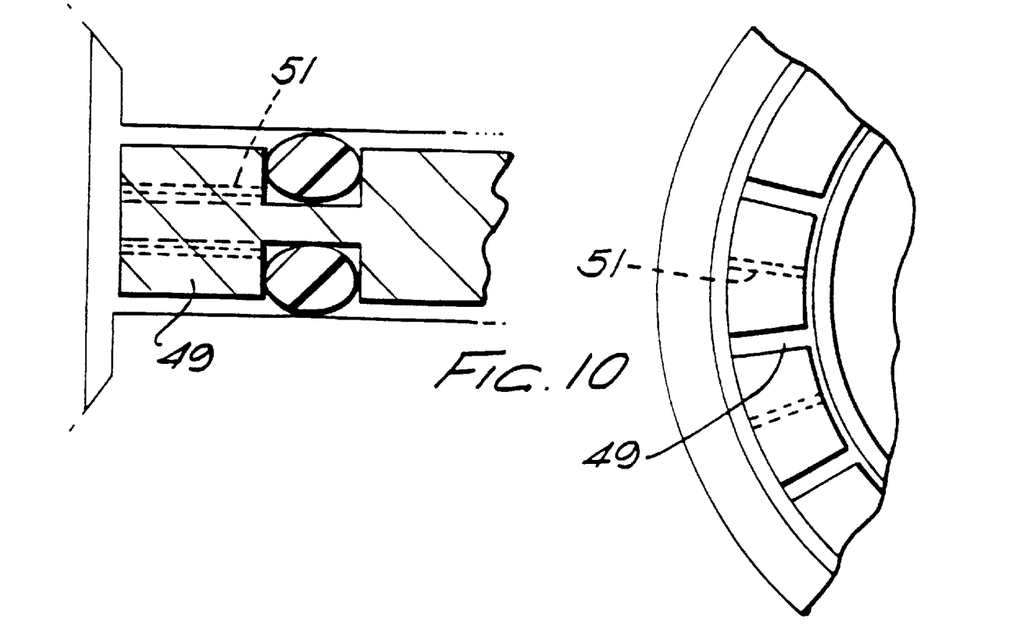
FIG. 10 is a schematic sectional side view and plan view of part of a reusable temporary seal used in a joint according to the present invention.

As will be appreciated, it is usually desirable for the temporary seal 15,37 to act as a non-return valve. Hence, when the temporary seal 15,37 is not being used, it may be preferable for the seal 15,37 to bear against. a castellated, non-sealing shoulder 49, as shown in FIG. 10 of the drawings. This non-sealing shoulder 49 may also include apertures or vents 51 through which fluid from the pipeline can pass to contact the main seal 9. As a result, the temporary seal 15,37 does not hinder the flow of fluid to the main seal 9.

Figure 11:
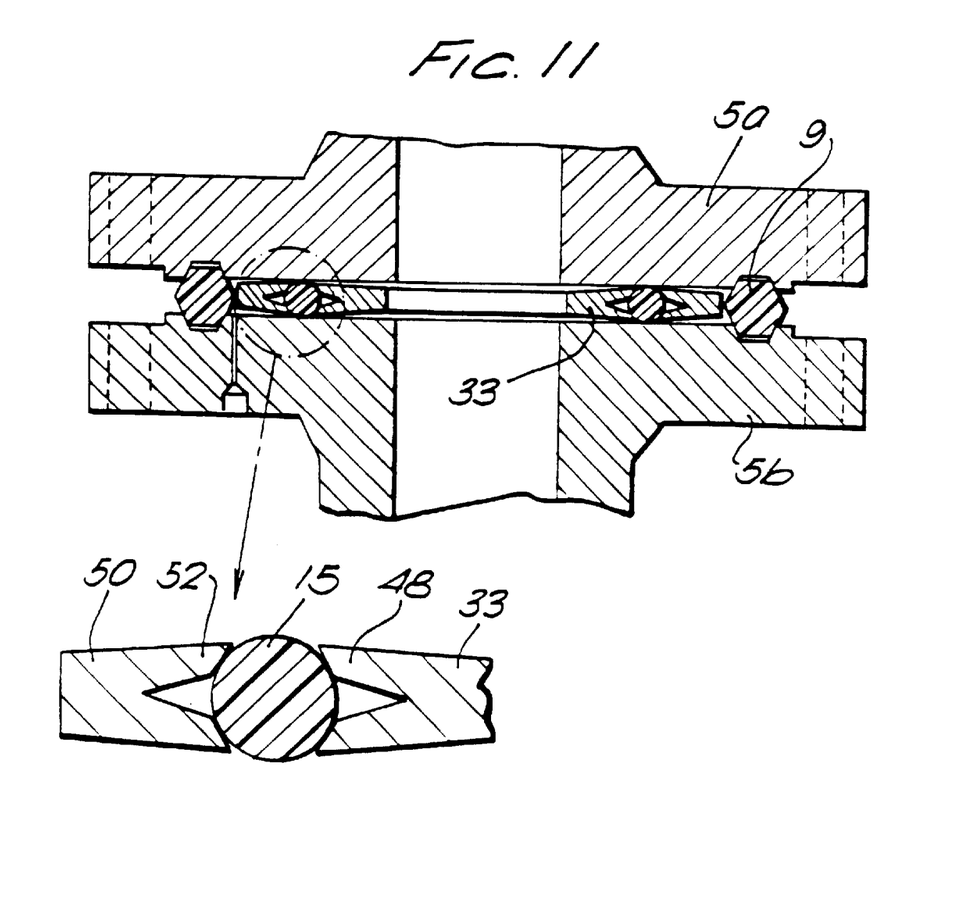
FIG. 11 is a sectional side view of another embodiment of support plate in a flange joint according to the present invention.

In another embodiment shown in FIG. 11 of the drawings, a support plate 33 includes a bifurcated or forked outer edge 48 against which a secondary seal 15 bears during testing of the main seal 9. Further, this bifurcated edge 48 allows the annular secondary seal 15 to be supported during installation of the support plate 33 in a joint. If desired, an outer annular wall 50, defining another bifurcated surface 52, can be provided to support the secondary seal 15 during normal usage of the joint. As a result, the secondary seal 15 may not be sacrificed following the initial testing of the main seal 9. Further, by using a bifurcated outer wall 50, this can be readily applied to the secondary seal 15 and carried thereby during installation into a pipe joint according to the present invention.

Figure 12:
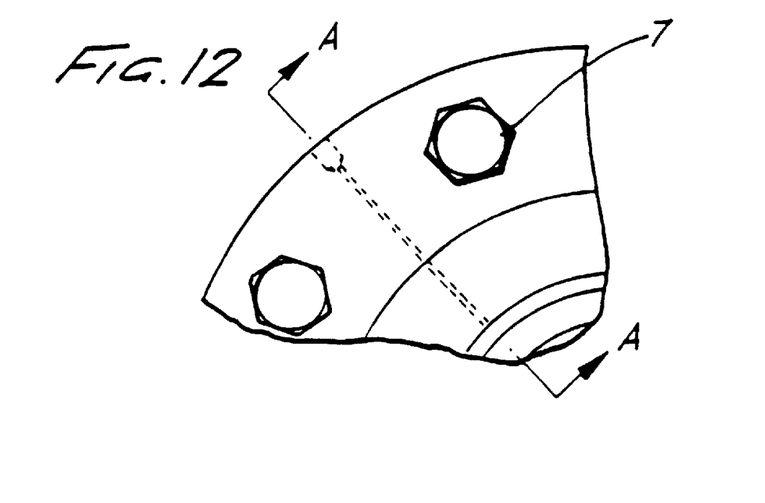
FIG. 12 is a schematic partial plan view and section on the line A—A of an alternative flange for a flange joint according to the present invention.

Finally, with regard to FIG. 12 of the drawings, another embodiment of flange for use in a joint according to the present invention is shown. In this embodiment, the main seal 9 is in the form of a sheet type gasket, spiral wound gasket or other flat seal contacting the flange 5b. A recessed "O" ring seal 15 is provided to define with the flat main seal 9 a cavity 17 to be pressurised. In this embodiment, the pressure test port 19 is positioned at the outer side of the flange 5b with the port duct 21 passing radially between the fixing bolts 7 to communicate with the cavity 17. In this embodiment, due to the main seal 9 configuration, a leak detection port is not provided.

As will be appreciated by those skilled in the relevant art, advantages of a joint and seal testing system according to the present invention may be as follows:

safer system to use, the volume of the pressurised test medium being vastly reduced cost of testing reduced by a significant factor, especially for confined space applications such as petro-chemical erection/maintenance, offshore hook up, etc.

one man operation multi process application, onshore, offshore, petro-chem, any medium to high pressure pipe work checking of each flange joint integrity can be carried out on completion of flange make up, no delay awaiting rest of system to be completed difficult access flange joints can be checked before they are "boxed in"

high volume gas testing, which is deemed to be a potentially hazardous operation, would be vastly reduced time taken for pressure testing greatly reduced drying and purging of lines after testing not required difficult pressure testing (complex systems) will be less of a problem requirement for in line vent and drain points may not be required weight of water requiring additional supports during testing (say in air or gas lines) may no longer be a problem area sterilised (area of no access) during testing greatly reduced pressure testing of access ways to vessels and high pressure duct work after inspection/maintenance would become a minor operation pressure testing can be carried out after insulation of flanges has taken place stripping out of lines/spools during testing will be less than with traditional system taperlock systems now not preferred method of mechanical connection by the majority of North Sea Operators, therefore greater use of traditional flanges which can use the testing system described environmentally more friendly, the volume of gas used to prove joint integrity vastly reduced.

The applications with male/female recess or double 'O' ring and steel ring enable high pressure connections to be made with only low torque being applied to the bolts. This is a new system of high pressure flange connection, that negates bolt tensioning.

It will of course be understood that the present invention has been described above purely by way of example, and that modifications of detail can be made within the scope of the invention. In certain cases the strength testing of a pipeline (hydro-testing) and gas leak testing could be carried out simultaneously, thereby satisfying flexible analysis requirements.

What is claimed is:

1. A joint comprising a main seal having an in-service direction thereby defining an in service side, a secondary seal positioned on the in-service side of the main seal and an external pressure test port providing access to a cavity between the main seal and the secondary seal, wherein the integrity of the main seal can be tested in its in-service direction by applying pressure to the cavity via the pressure lest port such that the cavity is pressurised and the main seal is tested, wherein the secondary seal, in use, bears against a support plate.

2. A joint as claimed in claim 1, wherein the pressure test port is threaded to accommodate a high pressure connector.

3. A joint as claimed in claim 1, wherein a leak detection port is included.

4. A joint as claimed in claim 3, where the leak detection port communicates with a chamber behind the main seal.

5. A joint as claimed in claim 3, wherein the leak detection port communicates with a chamber defined by the main seal.

6. A joint as claimed in claim 5, where the main seal defines two chambers in the joint, the two chambers being joined via a duct through the main seal.

7. A joint as claimed in claim 3, wherein the leak detection port is threaded to accommodate a sensor.

8. A joint as claimed in claim 1, wherein a bleed port is provided which communicates with the cavity between the main seal and the secondary seal.

9. A joint as claimed in claim 1, wherein the main seal is an annular seal.

10. A joint as claimed in claim 1, wherein the secondary seal is an "O" ring seal.

11. A joint as claimed in claim 1, which is a flanged joint comprising two flanges, the main seal being held between the flanges.

12. A joint as claimed in claim 11, wherein the flanges are secured together by means of bolts.

13. A joint as claimed in claim 11, wherein the secondary seal is positioned within a recess defined between the two flanges.

14. A joint as claimed in claim 11, wherein at least one of the flanges is shaped to receive the secondary seal.

15. A joint as claimed in claim 1, wherein the support plate is an annular disk defining shoulders for two secondary seals.

16. A joint as claimed in claim 1, wherein the support plate defines a recess for the secondary seal.

17. A joint as claimed in claim 1, wherein the secondary seal is bonded to the support plate.

18. A joint as claimed in claim 1, wherein the support plate defines a fork for receiving the secondary seal.

19. A joint as claimed in claim 18, wherein the fork is fonned on the outer edge of the support plate.

20. A joint as claimed in claim 18, wherein an external ring supports the secondary seal during normal usage of the joint.

21. A joint as claimed in claim 1, wherein the inside diameter of the support plate is equal to or greater than the bore of each flange.

22. A joint as claimed in claim 1, wherein the support plate includes surface fins.

23. A joint as claimed in claim 22, wherein the surface firs are crushable, during assembly, to enable sufficient pressure to be applied by the flanges to the main seal.

24. A joint as claimed in claim 1, wherein during normal use of the joint, the secondary seal bears against a support.

25. A joint as claimed in claim 24, wherein the support is a castellated shoulder to allow fluid to pass the secondary seal and contact the main seal.

26. A joint as claimed in claim 24, wherein the support is a shoulder through which apertures are formed to allow fluid to pass the secondary seal and contact the main seal.

27. A joint as claimed in claim 1, wherein the secondary seal provides a non-return valve which acts only when the main seal is to be tested.

28. A joint as claimed in claim 1, wherein the secondary seal includes a support having cross-section selected from the group consisting of a cruciform cross-section and a T-shaped cross-section.

29. A joint as claimed in claim 1, wherein the main seal is a substantially planar gasket or sealing material.

30. A method of testing a flange joint defined by two flanges and a main seal there between, the method comprising providing a secondary seal spaced internally from the main seal, applying pressure through an external pressure test port to a cavity formed by the main seal, the secondary seal and the flanges and evaluating the seal formed between the main seal and the flanges, wherein the secondary seal is redundant after testing of the main seal.

31. A method as claimed in claim 30, wherein the evaluation of the main seal is achieved using a pressure gauge.

32. A method as claimed in claim 31, wherein a threaded pressure test port provides communication between the cavity and the pressure gauge.

33. A method of testing a flange joint defined by two flanges and a main seal there between, the method comprising providing a secondary seal spaced internally from the main seal, applying pressure through an external pressure test port to a cavity formed by the main seal, the secondary seal and the flanges and evaluating the seal formed between the main seal and the flanges, wherein, following testing of the main seal, the pressure test port is closed by means of a blanking plug.

34. A method as claimed in claim 33, wherein the blanking plug is part drilled.

35. A joint comprising a main seal having an in-service direction thereby defining an in service side, a secondary seal positioned on the in-service side of the main seal, an external pressure test port providing access to a cavity between the main seal and the secondary seal, and a support plate shaped to receive said secondary seal, wherein the integrity of the main seal can be tested in its in-service direction by applying pressure to the cavity via the pressure test port such that the cavity is pressurised and the main seal is tested.

36. A method of testing a flange joint defined by two flanges and a main seal there between, the method comprising providing a secondary seal spaced internally from the main seal, providing a support plate receiving the secondary seal applying pressure through an external pressure test port to a cavity formed by the main seal, the secondary seal and the flanges and evaluating the seal formed between the main seal and the flanges.

37. A joint comprising a main seal having an in-service direction thereby defining an in service side, a secondary seal positioned on the in-service side of the main seal and an external pressure test port providing access to a cavity between the main seal and the secondary seal, wherein the integrity of the main seal can be tested in its in-service direction by applying pressure to the cavity via the pressure test port such that the cavity is pressurised and the main seal is tested, wherein the secondary seal is an "O" ring seal.

38. A joint comprising a main seal having an in-service direction thereby defining an in service side, a secondary seal positioned on the in-service side of the main seal and an external pressure test port providing access to a cavity between the main seal and the secondary seal, wherein the integrity of the main seal can be tested in its in-service direction by applying pressure to the cavity via the pressure test port such that the cavity is pressurised and the main seal is tested, wherein the main seal is a substantially planar gasket or sealing material.

39. A method of testing a flange joint defined by two flanges and a main seal there between, the method comprising providing a secondary seal spaced internally from the main seal, applying pressure through an external pressure test port to a cavity formed by the main seal, the secondary seal and the flanges and evaluating the seal formed between the main seal and the flanges, wherein the secondary seal is a non-return valve.

* * * * *

UNITED STATES PATENT AND TRADEMARK OFFICE
CERTIFICATE OF CORRECTION

PATENT NO.   : 6,299,216 B1
DATED        : October 9, 2001
INVENTOR(S)  : David F. Thompson It is certified that error appears in the above-identified patent and that said Letters Patent is hereby corrected as shown below:

<u>Column 9,</u>
Line 13, delete "lest" and insert -- test --
Line 56, delete "fonned" and insert -- formed --
Line 65, delete "firs" and insert -- fins --

Signed and Sealed this

Seventeenth Day of June, 2003

JAMES E. ROGAN
*Director of the United States Patent and Trademark Office*